United States Patent [19]

Moranne

[11] 4,315,540
[45] Feb. 16, 1982

[54] DEVICE FOR FIXING A RADIATOR INTO A VEHICLE PARTICULARLY INTO A HEAVY-TRUCK VEHICLE

[75] Inventor: Jean-Pierre Moranne, Franconville, France

[73] Assignee: Societe Anonyme des Usines Chausson, Hauts-de-Seine, France

[21] Appl. No.: 145,269

[22] Filed: Apr. 25, 1980

[30] Foreign Application Priority Data

May 4, 1979 [FR] France .................................. 79 11294

[51] Int. Cl.³ .............................................. F28F 9/00
[52] U.S. Cl. ...................................... 165/67; 165/149; 180/68 R
[58] Field of Search ............................ 65/67, 69, 149; 180/68 R

[56] References Cited

U.S. PATENT DOCUMENTS

| | | | |
|---|---|---|---|
| 1,447,695 | 3/1923 | Storms | 180/68 R |
| 1,593,244 | 7/1926 | Cutler | 165/69 |
| 1,834,709 | 12/1931 | Ihde | 180/68 R |
| 1,840,417 | 1/1932 | Seelert | 165/69 |
| 1,963,429 | 6/1934 | Young | 180/68 R |
| 2,506,051 | 5/1950 | Young | 165/67 |
| 2,755,874 | 7/1956 | Adloff | 180/68 R |
| 3,795,274 | 3/1974 | Fieni | 165/67 X |
| 3,858,291 | 1/1975 | Perpall | 165/69 |
| 4,137,982 | 2/1979 | Crews et al. | 180/68 R |

*Primary Examiner*—Sheldon J. Richter
*Attorney, Agent, or Firm*—Browdy and Neimark

[57] ABSTRACT

The device for resiliently mounting a radiator in a frame of a vehicle, particularly a heavy-truck vehicle, comprises a cradle surrounding the radiator, and resilient means urgingly mounted between headers of the radiator and corresponding portions of the cradle for exerting a permanent compression effort onto the radiator.

13 Claims, 2 Drawing Figures

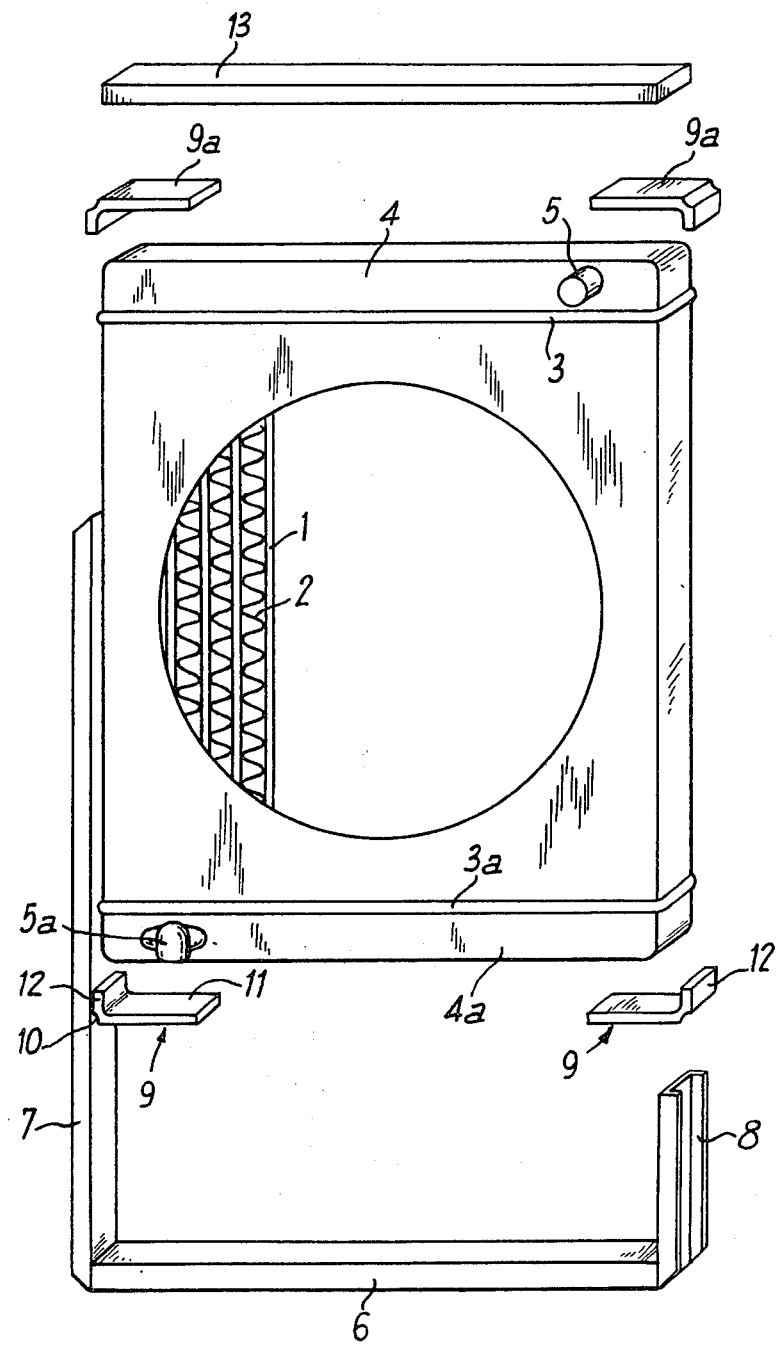

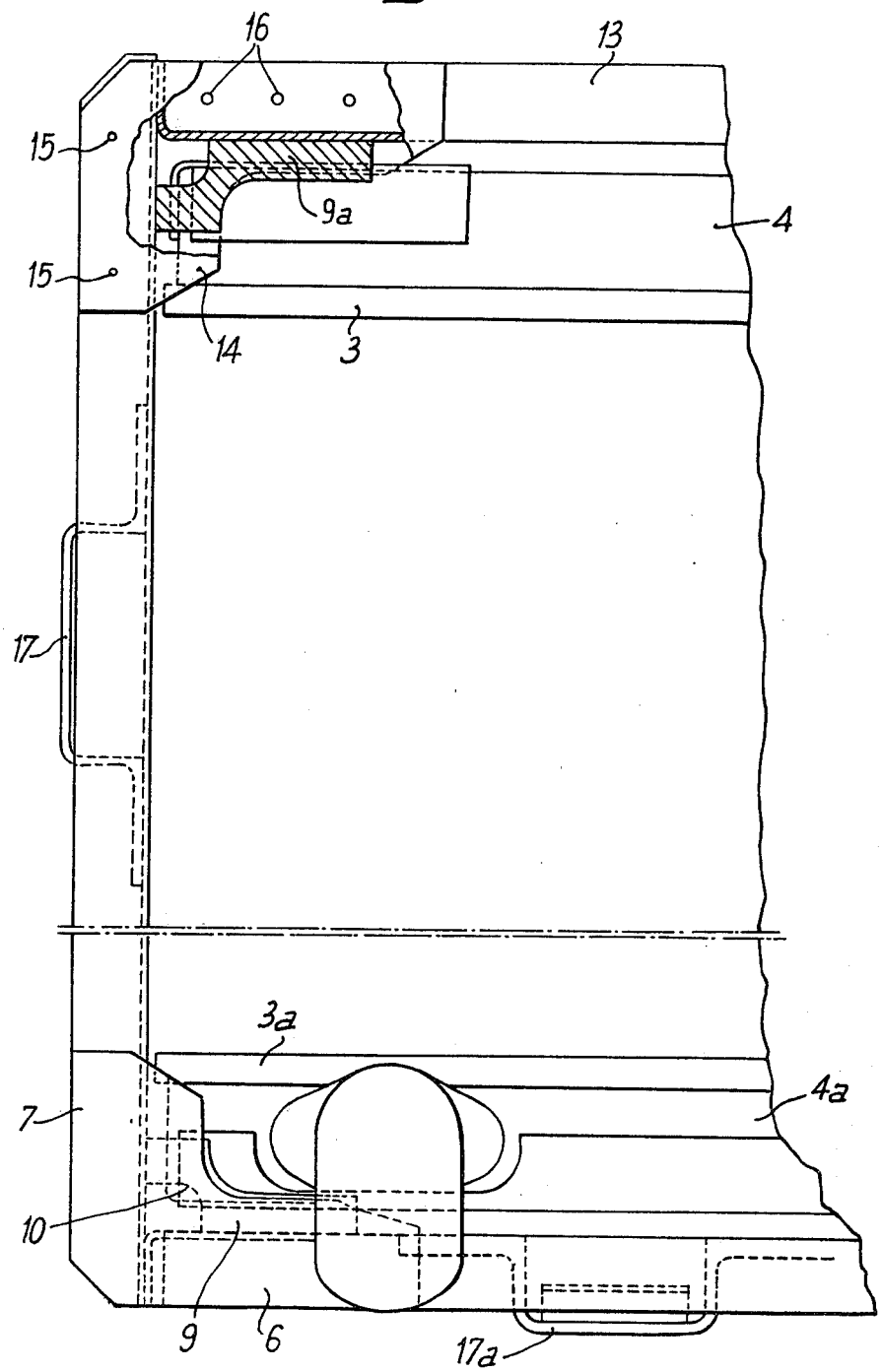

DEVICE FOR FIXING A RADIATOR INTO A VEHICLE PARTICULARLY INTO A HEAVY-TRUCK VEHICLE

BACKGROUND OF THE INVENTION

The present invention relates to mounting of radiators, particularly cooling radiators in heavy-truck vehicles used in severe conditions such as heavy trucks, for example vehicles provided to run on bad tracks.

It has been found that the frame of vehicles running on slightly prepared tracks or unprepared terrain is subjected to twisting forces and it thus happens that these twisting forces are transmitted to the suspension means of the radiator or radiators causing damages to the latter.

To remedy the above drawbacks, there has been proposed resilient suspension means for the radiators and it has even been already found by the applicant to mount radiators inside a cradle or a belt by connecting the radiators to this cradle or belt through rigid and localised fixation means, for example studs, pins, or other similar means.

Despite the above precautions, it has appeared that ruptures can still be produced.

SUMMARY OF THE INVENTION

The invention concerns consequently a new device which avoids and overcomes the drawbacks of the known art and to very efficaciously protect the radiators which moreover can be made at a particularly low cost.

According to the invention, the device for fixing radiators into a vehicle, particularly a heavy-truck vehicle, comprises a cradle surrounding the radiator and resilient blocks interposed between headers of the radiators and corresponding parts of the cradle, said resilient blocks being urgingly maintained in order to exert a permanent compression effort on the radiator.

BRIEF DESCRIPTION OF THE DRAWING

Various further and more specific objects of this invention are to become readily apparent to persons skilled in the art from a consideration of the following description when taken in conjunction with the accompanying drawing wherein:

FIG. 1 is an exploded diagrammatic perspective view of a radiator and its supporting cradle carrying the invention into effect; and FIG. 2 is an enlarged elevation view, partly broken away, showing a detail of the FIG. 1 embodiment.

DETAILED DESCRIPTION OF THE PREFERRED EMBODIMENT

Referring now to the drawing, a cooling radiator for vehicles is shown. It is particularly suitable for heavy-truck vehicles. The radiator includes tubes 1 and secondary heat exchange elements 2 in the form of fins. The tubes come into tube plates 3, 3a which are covered by headers 4, 4a provided with pipes such as those shown at 5 and 5a.

In the example as illustrated, the radiator properly so called does not have side flanges, the tubes plates and headers being only connected by the tubes 1. It is however within the scope of the invention that the radiator can have side flanges for connecting the smaller sides of the tube plates or of the headers.

The radiator as described above is provided to be mounted in a cradle which is a sole piece 6, made for example by a U-shaped iron, and which is connected at its ends to uprights 7, 8 also made by U-shaped irons.

The radiator is inserted between the two uprights 7 and 8, and it bears on the sole piece 6 through resilient blocks 9 made for example of rubber. In the illustrated example the blocks 9 have substantially the shape of a right angle in the outer angled portion of which is made a groove 10, in order that only the arms of the right angle part will bear, on the one hand, against the sole piece 6 and, on the other hand, against the inner wall of the uprights 7, 8.

The inner side 11 of the right angle part is made in a way complementary to the portion of the corresponding wall of the header 4a. The resilient blocks 9 can be either plain parts or alveolate parts, and can for example have ribs extending in a plurality of directions for making a cross-bracing.

Upon insertion of the radiator between the uprights 7, 8, the smaller side 12 of each right angle part is pressed against the wall of the uprights 7 and 8. After a complete insertion of the radiator between the uprights, other blocks 9a identical to the above mentioned blocks 9 are placed in a manner similar to that above mentioned, the blocks 9a surrounding the ends of the header 4. A cover 13 is then positioned between the ends of the uprights 7, 8.

The cover 13 is positioned while a pressure is exerted upon it, thereby deforming the longer sides of the blocks 9 and 9a. Then the cover 13 is fixed to the uprights 7, 8 of the cradle for example by gussets 14, which are connected to the uprights 7, 8 by soldering points 15 and to the cover 13 by bolts or pins 16. Therefore, when the cover is positioned, the radiator is maintained under a permanent compression constrain.

The resiliency of the blocks 9, 9a is choosen with respect to the weight of the radiator proper so that and there is exerted on the blocks a compression force so that the natural frequency of the radiator pressed between the various resilient blocks is always greater than the frequencies produced upon running of the vehicle carrying the radiator.

More often, it is thus necessary that the natural frequency of the radiator be greater than 1 Hz, but preferably the compression constrain which is exerted is choosen so that the natural frequency is much higher, and for example in the vicinity of 30 Hz.

The cradle which is made by the sole piece 6, the uprights 7, 8 and the cover 13 is used for fixing the radiator to the vehicle by conventional means. Therefore, as shown in FIG. 2, the cradle comprises mounting lugs 17, 17a carried by the uprights, the sole piece and possibly the cover.

In the above set out description, it has been explained that the resilient blocks were made as parts of rubber or the like material, but they can also be made according to other ways, for example, as metal springs placed between the lower header and the sole piece 6, on the one hand, and between the upper header and the cover 13, on the other hand. Similarly it is also possible to combine rubber blocks and metal springs.

The invention is not restricted to the embodiment shown and described in detail since various modifications thereof can be applied thereto without departing from its scope.

I claim:

1. An arrangement for resiliently mounting a radiator having a front face adapted to be mounted vertically in a vehicle, the arrangement comprising:
    a cradle surrounding the radiator, means to mount said cradle on said vehicle said radiator having upper and lower headers which each include horizontal and vertical portions, said horizontal and vertical portions being disposed substantially perpendicular to said front face; and
    resilient means mounted between said horizontal portion of said headers and corresponding adjacent portion of said cradle and also between said vertical portion of said headers and corresponding adjacent portion of said cradle, said resilient means applying permanent compression forces onto the radiator for isolating it from said cradle.

2. An arrangement as set forth in claim 1, wherein for a radiator of a given weight, said resilient means have such a resiliency and substantially permanent effect of such a magnitude that the occurring frequency of said radiator in said cradle is greater than 1 Hz. and greater than the frequencies caused by running of the vehicle.

3. An arrangement as set forth in claim 2, wherein said occurring frequency of said radiator in said cradle is about 30 Hz.

4. An arrangement as set forth in claim 1, wherein said resilient means comprise resilient material.

5. An arrangement as set forth in claim 1, wherein the resilient means are made of blocks of rubber.

6. An arrangement as set forth in claim 1, wherein the resilient means are made of metal springs.

7. An arrangement as set forth in claim 1, wherein the cradle comprises a sole piece, a cover and two upright members connecting the sole piece to the cover, and wherein the resilient means are made of rubber moulded parts having substantially the shape of a right angle to bear, on the one hand, against the sole piece and the cover of the cradle and, on the other hand, against the upright members of the cradle.

8. An arrangement as set forth in claim 7, wherein said rubber moulded parts each have a groove at outer angle of the part.

9. An arrangement as set forth in claim 1, wherein the resilient means are shaped to conform to parts of the headers of the radiator.

10. An arrangement as set forth in claim 1, wherein the resilient means have at least in part an alveolate structure.

11. An arrangement as set forth in claim 1, wherein the radiator is free of side flanges.

12. An arrangement according to claim 1, wherein the radiator is provided with side flanges.

13. An arrangement for resiliently mounting a radiator in a vehicle, the arrangement comprising:
    a cradle surrounding the radiator,
    means to mount the cradle on the vehicle,
    said radiator being of generally rectilinear shape and having upper and lower headers which each include horizontal and vertical portions,
    resilient mounting means located between said horizontal and vertical portions of said headers and corresponding adjacent portions of said cradle,
    said cradle comprising a horizontal sole piece, a horizontal cover and two vertical members connecting the sole piece to the cover, said resilient means comprising four molded rubber parts each having substantially a right angle shape and located one in each of the four corners between said radiator and said cradle,
    each of said right angle resilient rubber molded parts comprising a vertical and a horizontal portion to bear, with their horizontal portions, against the sole piece and the cover of the cradle and, with their vertical portions, against the vertical members of the cradle, and
    said cover being secured to said cradle vertical members to apply compression forces onto the radiator via said resilient rubber parts to isolate said radiator from said cradle.

* * * * *

UNITED STATES PATENT AND TRADEMARK OFFICE
CERTIFICATE OF CORRECTION

PATENT NO. : 4,315,540
DATED : February 16, 1982
INVENTOR(S) : Jean-Pierre MORANNE It is certified that error appears in the above-identified patent and that said Letters Patent are hereby corrected as shown below:

Column 2, line 39, delete "and" at the end of the line

Signed and Sealed this

Third Day of August 1982

[SEAL]

Attest:

GERALD J. MOSSINGHOFF

Attesting Officer

Commissioner of Patents and Trademarks